UNITED STATES PATENT OFFICE.

SAMUEL E. SHAFFNER, OF ST. LOUIS, MISSOURI.

PINEAPPLE PRODUCT.

1,214,598. Specification of Letters Patent. Patented Feb. 6, 1917.

No Drawing. Application filed May 15, 1916. Serial No. 97,703.

*To all whom it may concern:*

Be it known that I, SAMUEL E. SHAFFNER, a citizen of the United States, residing at the city of St. Louis, State of Missouri, have invented a certain new and useful Pineapple Product, of which the following is a specification.

This invention relates to a certain new and useful marketable pineapple-product.

In the pineapple packing and canning industry, in the paring of the fruit preparatory to slicing, crushing, or grating, the outer skin or peel and the core of the fruit are removed and have, with that part of the edible fruit which is cut away with the skin or peel and core, been heretofore, so far as I am aware, thrown away and discarded as waste. With such pineapple skins or peels and cores and that part of the edible fruit which is cut away with the skins and cores, which I define as raw pineapple waste, I am concerned here, for I have discovered that such waste matter may be converted into a product or material crude and inedible, but capable of, or adapted for, many uses—a product or material which may, for instance, as a raw or crude material, be commercially utilized in imparting to, or incorporating in, jellies, jams, preserves, marmalades, and the like, and pharmaceutical and proprietary medicinal preparations and so-called patent medicines a pineapple flavor, or as a constituent or element of various food products and remedial agents, and which may also, when properly treated, be commercially utilized, for instance, in the production of pineapple extract for general flavoring purposes, as in confectionery, ice-creams, soda-water, and the like, or in the production of pineapple juice, or in the manufacture of digestive ferments and the like, or in the manufacture and production generally of pharmaceutical and analogous preparations for incorporating therein the medicinal properties of the pineapple.

With the object then of converting into a useful and valuable product or material the described raw pineapple waste, comprising, as stated, the skins or peels and cores and that part of the edible fruit that adheres to, and is cut away with, the skin or peel and core, I first grind or otherwise reduce this raw waste, in the mass, into relatively small particles, flakes, lumps, shreds, or the like having preferably a degree of fineness corresponding approximately to that of coarse crushed pineapple, employing for such purpose any suitable grinding or reducing machine or apparatus. To then facilitate comparatively rapid drying of said matter, I next subject the same, so reduced to flaked or shredded form, as it might be described, to suitable action to expel or remove therefrom only such surplus water or juice that may be mechanically held therein. For this purpose I preferably employ any suitable rotary or centrifugal machine or apparatus; and since it is important, practically essential, that there be, in this step or part of my process, little or no intercellular extraction of the juice, I, as it may be described, centrifugalize the same matter at a relatively low speed, say, approximately 480 revolutions a minute. It will be understood, however, that the centrifugalizing speed may be accelerated or reduced as different textures of matter or conditions may require, without effecting extraction of the juice from within the particles, flakes, or shreds. It will also be understood that, for so expelling or removing only the surplus juice or water from the said waste matter, a suitable press or the like might also perhaps be equally well employed, the extent or duration of this centrifugalizing or pressing action upon the said matter being such as to effect and accomplish preferably a removal from the said matter of substantially all the described surplus liquid or juice content thereof.

The described centrifugalized or pressed flaked or shredded waste matter is now ready for drying, the next step in my process of producing my said product. This drying step I now begin and accomplish more or less rapidly and before fermentation can set in, that is to say, within approximately eighteen hours from the first handling of the said matter in flaking or shredding the same. And in now drying the described matter, I prefer to employ any proper drying machine or apparatus of suitable or approved construction, and of which hence a detail description may be here omitted. I might also here state that, under favorable atmospheric conditions, controlled largely by the degree of humidity in the atmosphere and the velocity of atmospheric movement, the described matter may, for economy, be dried upon suitable frames in direct sunlight. The length of time required to effect substantially complete drying of the said matter may vary under different conditions; in the open, I have found that substantially perfect drying of said matter is accomplished within approximately ten hours, and, on the other hand, when the said matter is subjected to the heated or hot air of a suitable drying machine or apparatus, I have found that practically complete drying of said matter is effected within approximately six to eight hours. It is important, however, that, in drying the said matter, the said matter be subjected to a temperature not exceeding approximately 120° F. (48.8° C.), in order that drying said matter shall not effect a destruction of any of the digestive principles, especially bromelin, of the pineapple or materially or injuriously affect the flavor-giving alcohols, acids, and ethers normally present in the pineapple waste. The product, so flaked or shredded, centrifugalized or pressed, and dried, is now in finished form and ready for marketing, and I have found that this product or material is adapted for many uses, being of special value in the manufacture or production of many medicinal articles and preparations, food products, and the like, some of which I have hereinbefore specifically mentioned.

The peel or skin of the pineapple fruit is usually very rich in flavor, due not only to the fact that, as the fresh fruit ripens, circulation in the fruit being to or toward the outside, the products of the ripening process naturally carried on are stored in the peel, but also because oxidation of the alcohols of the fruit, as well as other chemical actions naturally occurring in the ripening of the fruit, take place fully in the peel. This peel or skin has heretofore been ordinarily discarded, as I have before stated, as pure waste; I, however, in the production, and as part, of my new product or material utilize this peel fully and largely attribute thereto the true pineapple flavor giving or imparting property of my material or product.

I might add that, in the production as described of my said product or material, the physical composition of the said waste-matter, other than the mere removal of its surplus liquid content, is in no way changed, nor is there, in the production of my said product, any chemical action or reaction in said matter other than that which naturally results from the uniting of the chemical elements or compounds, or between the alcohols, acids, or other chemical elements, naturally present in the fruit; and since I employ, in the production of my said material or product, a minimum degree of heat, my new product retains fully and unimpaired all the beneficial food and remedial properties and characteristic flavor of the fresh fruit, which properties and flavor my product imparts to, or incorporates in, various articles or products when employed in the manufacture or production thereof. Thus, in and by the production of my new material or product, I utilize the present waste products of the pineapple canning and packing industry and render possible the manufacture or production at lower cost and with greater purity of many products and preparations now upon the open market.

Having thus described my invention, what I claim and desire to secure by Letters Patent is:

1. As a new article of manufacture, a crude, inedible pineapple product for uses substantially as described, said product including flaked or shredded raw pineapple peel, said flakes or shreds being in externally dried condition, but retaining and possessing internally the juice and chemical elements or compounds of the pineapple fruit.

2. As a new article of manufacture, a crude, inedible pineapple product for uses substantially as described, said product including in flaked or shredded form the raw peel and core of the pineapple fruit, said flakes or shreds being in externally dried condition, but retaining and possessing internally the juice and chemical elements or compounds of the pineapple fruit.

3. As a new article of manufacture, a crude, inedible pineapple product for uses substantially as described, said product including in flaked or shredded form the raw peel, core, and that part only of the edible fruit of the pineapple which in the paring of the fruit is cut away with, and adheres to, the peel and core, said flakes or shreds being in externally dried condition, but retaining and possessing internally the juice and chemical elements or compounds of the pineapple fruit.

4. As a new article of manufacture, a crude, inedible, and unfermented pineapple product for uses substantially as described, said product including in flaked or shredded form the raw peel, core, and that part only of the edible fruit of the pineapple which in the paring of the fruit is cut away with, and adheres to, the peel and core, said flakes or shreds being in externally dried condition, but retaining and possessing internally the juice and chemical elements or compounds of the pineapple fruit.

5. As a new article of manufacture, a crude, dried, inedible, and unfermented pineapple product for use substantially as described, said product including in flaked or shredded form the raw peel, core, and that part only of the edible fruit of the pineapple which in the paring of the fruit is cut away with, and adheres to, the peel and core, said flakes or shreds being characterized by possessing approximately all the beneficial properties of the fresh pineapple fruit.

In testimony whereof, I have signed my name to this specification.

SAMUEL E. SHAFFNER.

Copies of this patent may be obtained for five cents each, by addressing the "Commissioner of Patents, Washington, D. C."